(12) United States Patent  
DeNeui et al.

(10) Patent No.: US 8,914,578 B2  
(45) Date of Patent: Dec. 16, 2014

(54) CAPACITY-EXPANSION OF A LOGICAL VOLUME

(71) Applicant: Hewlett-Packard Development Company, L.P., Houston, TX (US)

(72) Inventors: Nathaniel S. DeNeui, Houston, TX (US); Joseph David Black, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 188 days.

(21) Appl. No.: 13/628,575

(22) Filed: Sep. 27, 2012

(65) Prior Publication Data

US 2014/0089581 A1 Mar. 27, 2014

(51) Int. Cl.
*G06F 12/00* (2006.01)
*G06F 3/06* (2006.01)

(52) U.S. Cl.
CPC .................................. *G06F 3/0689* (2013.01)
USPC ........................................................ 711/114

(58) Field of Classification Search
None
See application file for complete search history.

(56) References Cited

U.S. PATENT DOCUMENTS

| 5,758,118 | A | 5/1998 | Choy et al. | |
|---|---|---|---|---|
| 6,718,436 | B2 | 4/2004 | Kim et al. | |
| 7,107,385 | B2 | 9/2006 | Rajan et al. | |
| 7,127,557 | B2 | 10/2006 | Ito et al. | |
| 7,809,917 | B2 | 10/2010 | Burton et al. | |
| 8,499,136 | B1 * | 7/2013 | Chatterjee et al. | 711/170 |
| 2005/0235337 | A1 * | 10/2005 | Wilson et al. | 725/134 |
| 2011/0167219 | A1 * | 7/2011 | Klemm et al. | 711/114 |
| 2011/0252196 | A1 * | 10/2011 | Shiga et al. | 711/114 |
| 2013/0067191 | A1 * | 3/2013 | Mehra et al. | 711/173 |
| 2013/0290626 | A1 * | 10/2013 | Sundrani | 711/114 |

* cited by examiner

*Primary Examiner* — April Y Blair
*Assistant Examiner* — Jason Blust

(57) ABSTRACT

Expanding capacity of a logical volume is described. In an example a logical volume is described by a global metadata unit and a plurality of local metadata units. The global metadata unit includes a description of the logical volume, a list of the plurality of local metadata units, and ranges of logical blocks of the logical volume corresponding to the plurality of local metadata units. Each of the local metadata units includes a description of a local RAID set and a range of logical blocks on the local RAID set. When a new drive is to be added to the logical volume to increase capacity, a new local metadata unit is created. The new local metadata unit includes a description of a new local RAID set to be added to the RAID volume and a range of logical blocks on the new drive. The new local metadata unit is added to the global metadata unit to expand the logical volume to incorporate the new local RAID set.

19 Claims, 5 Drawing Sheets

| | 210 |
|---|---|
| Volume Identifier | "Volume 1" |
| Volume Capacity | 0x10000000 blocks |
| RAID type | RAID-1 |
| Local Metadata List | LocalData A – logical blocks 0x00000000 – 0x0FFFFFFF |

| | 212A |
|---|---|
| RAID type | RAID 1 – 2 Drive |
| Disk 1 | Disk A – logical blocks 0x00000000 – 0x0FFFFFFF |
| Disk 2 | Disk B – logical blocks 0x00000000 – 0x0FFFFFFF |

FIG. 3

| | 210 |
|---|---|
| Volume Identifier | "Volume 1" |
| Volume Capacity | 0x30000000 blocks |
| RAID type | RAID-1 |
| Local Metadata List | LocalData A – logical blocks 0x00000000 – 0x0FFFFFFF |
| | LocalData B – logical blocks 0x10000000 – 0x1FFFFFFF |
| | LocalData C – logical blocks 0x20000000 – 0x2FFFFFFF |

| | 212A |
|---|---|
| RAID type | RAID 1 – 2 Drive |
| Disk 1 | Disk A – logical blocks 0x00000000 – 0x0FFFFFFF |
| Disk 2 | Disk B – logical blocks 0x00000000 – 0x0FFFFFFF |

| | 212B |
|---|---|
| RAID type | RAID 1 – 2 Drive |
| Disk 1 | Disk A – logical blocks 0x10000000 – 0x1FFFFFFF |
| Disk 2 | Disk C – logical blocks 0x00000000 – 0x0FFFFFFF |

| | 212C |
|---|---|
| RAID type | RAID 1 – 2 Drive |
| Disk 1 | Disk B – logical blocks 0x10000000 – 0x1FFFFFFF |
| Disk 2 | Disk C – logical blocks 0x10000000 – 0x1FFFFFFF |

CAPACITY-EXPANSION OF A LOGICAL VOLUME

BACKGROUND

In some computer systems, multiple physical disk drives can be grouped and accessed as a single logical volume. The logical volume is often implemented using a RAID (Redundant Array of Independent Disks) technique. RAID is a storage technology that combines multiple disk drive components into a logical unit. Data is distributed across the physical disk drives using a particular configuration or "RAID level." Different RAID levels can be employed, depending on what level of redundancy (e.g., fault tolerance) and performance is required. Typically, a set number of physical disk drives are set aside for implementation of a RAID volume. Accordingly, the RAID volume has a given storage capacity depending on the storage capacity of the disk drives and the particular RAID level being employed.

BRIEF DESCRIPTION OF THE DRAWINGS

Some embodiments of the invention are described with respect to the following figures:

FIG. 3 is a block diagram showing global and local metadata units according to an example implementation;

FIG. 4 is a block diagram showing global and local metadata units according to another example implementation;

DETAILED DESCRIPTION

Expanding capacity of a logical volume is described. In an example implementation, a logical volume is described by a global metadata unit and a plurality of local metadata units. The global metadata unit includes a description of the logical volume, a list of the plurality of local metadata units, and ranges of logical blocks of the logical volume corresponding to the plurality of local metadata units. Each of the local metadata units includes a description of a local RAID set and a range of logical blocks on the local RAID set. When a new drive is to be added to the logical volume to increase capacity, a new local metadata unit is created. The new local metadata unit includes a description of a new local RAID set to be added to the RAID volume and a range of logical blocks on the new drive. The new local metadata unit is added to the global metadata unit to expand the logical volume to incorporate the new local RAID set. In an example, the new local RAID set includes the new physical drive and at least one physical drive from the existing local RAID sets in the logical volume.

Figure 1:
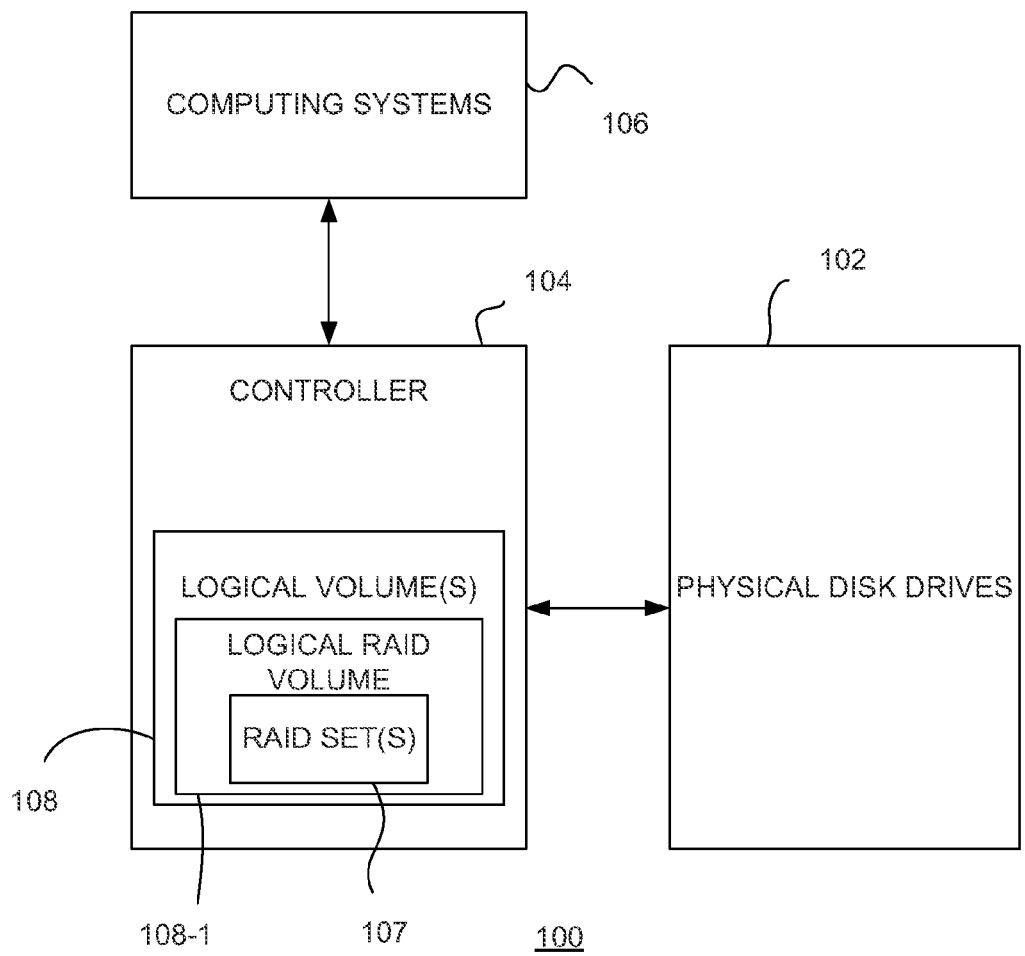
FIG. 1 is a block diagram showing a storage system according to an example implementation.

FIG. 1 is a block diagram showing a storage system 100 according to an example implementation. The storage system 100 includes a plurality of physical disk drives 102 and a controller 104. Various computing systems 106 can communicate with the controller 104 to write and read data from the physical disk drives 102. The controller 104 organizes the physical disk drives 102 to provide logical volume(s) 108, which is/are presented to the computer systems 106. That is, the computing systems 106 do not directly access the individual physical disk drives 102, but rather the logical volume(s) 108 presented and controlled by the controller 104.

In an example, one or more of the logical volume(s) 108-1 comprises at least one RAID (Redundant Array of Independent Disks) set (RAID set(s) 107 or local RAID set(s) 107). That is, multiple ones of the physical disk drives 102 are combined to form RAID set(s) 107 such that the data is distributed across the selected physical disk drives 102 using a particular scheme or "RAID level." Examples of RAID levels include RAID-0 (striping data across multiple disk drives), RAID-1 (mirroring data across multiple disk drives), RAID-5 (block-level striping with parity). Other examples of RAID levels include RAID-2, RAID-3, RAID-4, RAID-6, RAID-10 (also known as RAID 0+1), RAID-50, RAID-60, and the like. RAID set(s) are combined to form a logical volume 108. Each of the logical volume(s) 108 can include a fault-tolerant configuration of RAID set(s) (e.g., RAID-1 or RAID-5 set(s)), or a non-fault-tolerant configuration of RAID set(s) (e.g., RAID-0 set(s)). The controller 104 maintains metadata as described below to provide mapping between logical volume(s) 108, RAID set(s) 107, and physical disk drives 102.

Figure 2:
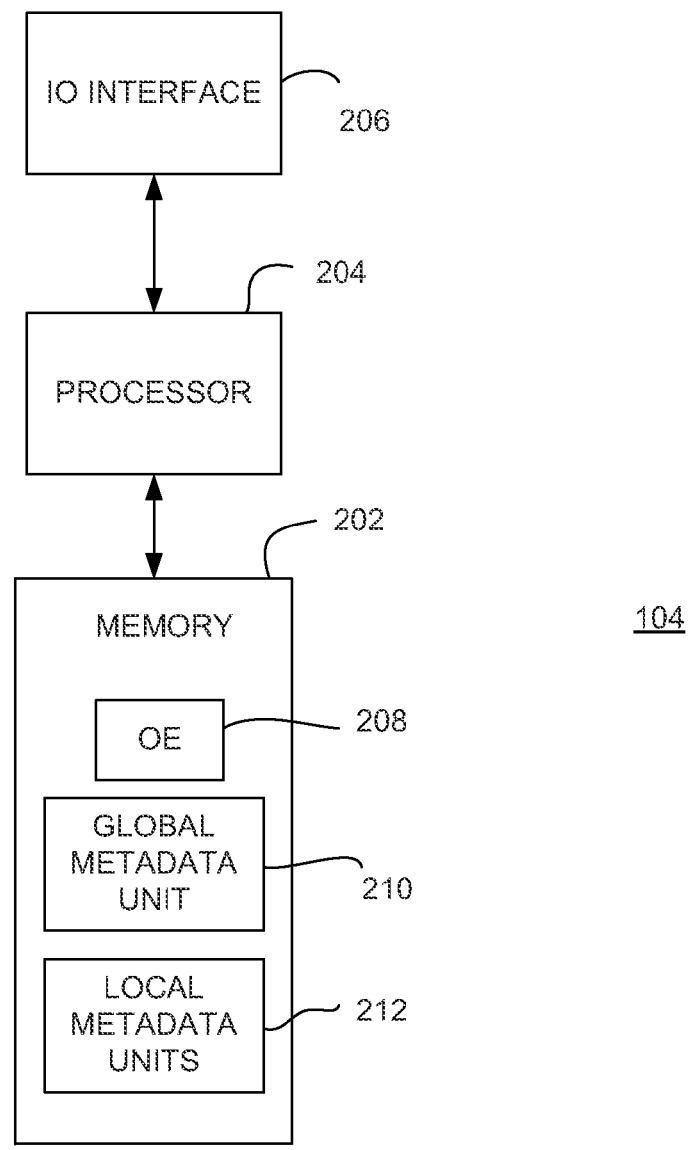
FIG. 2 is a block diagram of a controller in the storage system of FIG. 1 according to an example implementation.

FIG. 2 is a block diagram of the controller 104 according to an example implementation. The controller 104 includes a memory 202, a processor 204, and an input/output (IO) interface 206. The processor 204 can include any type of microprocessor, microcontroller, or the like known in the art. The memory 202 can include random access memory, read only memory, cache memory, magnetic read/write memory, or the like or any combination of such memory devices. The 10 interface 206 can provide busses, bridges, and the like to facilitate communication with the components of the controller 104.

The memory 202 can store code executable by the processor 204 to provide an operating environment (OE) 208 (e.g., firmware). A user can interact with the OE 208 to configure the controller 104 and the attached physical disk drives 102. For example, a user can interact with the OE 208 to select particular disk drives and organize them into RAID sets of a particular type (e.g., particular RAID level), and RAID sets into logical volumes. Alternatively, an external system (e.g., one of the computing systems 106) can interact with the OE 208 to configure the controller 104 and the attached physical drives 102 automatically without user interaction.

In an example, the OE 208 can facilitate instant-capacity expansion of a logical volume organized by the controller 104. That is, a user or other system can interact with the OE 208 to add capacity to a previously established and utilized logical volume. The computing systems 106 can immediately use the new capacity once added to the logical volume. The computer systems 106 do not have to wait for the controller 104 to re-organize the data on the physical drives that makeup the logical volume (e.g., re-strip, re-arrange, etc. the constituent RAID sets).

In an example, the controller 104 uses a particular mapping scheme for mapping logical blocks of the logical volume to physical blocks of the underlying disk drives that facilitates instant-capacity expansion. In an example, the mapping scheme includes two types of metadata referred to as global metadata and local metadata. That is, the memory 202 stores a global metadata unit 210 and a plurality of local metadata units 212 for each logical volume managed by the controller 104. The global metadata unit 210 includes information about the logical volume itself, whereas each local metadata unit 212 includes information about a particular constituent RAID set.

The global metadata unit 210 can include a description of the logical volume, a list of local metadata units corresponding to the physical drives, and ranges of logical blocks of the logical volume corresponding to the local metadata units. The description of the logical volume can include various types of information, such as a name of the logical volume, a capacity of the logical volume, RAID type employed for the underlying RAID sets, and the like. Each local metadata unit 212 can include a description of the local RAID set and a range of logical blocks corresponding to each disk in the local RAID set.

FIG. 3 is a block diagram showing global and local metadata units according to an example implementation. The global metadata unit 210 includes fields for a volume identifier for the logical volume (e.g., "Volume 1"), a volume capacity for the logical volume (e.g., "0x10000000 blocks"),a RAID type of the underlying RAID set(s) (e.g., RAID-1)., and a list of local metadata units and corresponding ranges of the logical volume (e.g., Local Data A corresponding to logical blocks 0x00000000-0x0FFFFFFF. A local metadata unit 210A corresponds to "LocalData A" referenced in the global metadata unit 210. The local metadata unit 212A includes fields for a RAID type (e.g., RAID-1, 2 drives), and drive map information (e.g., Disk A storing logical blocks 0x00000000 to 0x0FFFFFFF and Disk B storing logical blocks 0x00000000 to 0x0FFFFFFF). In the present example, "Volume 1" includes one underlying local RAID set A using RAID-1. The local RAID set A is a 2-drive RAID-1 having Disks A and B. It is to be understood that the global and local metadata units in FIG. 3 are examples and that the global and local metadata units 210 and 212A can include other types of data used to describe the logical volume and local RAID sets.

FIG. 4 is a block diagram showing global and local metadata units according to an example implementation. In the present example, the "Volume 1" logical volume is expanded by the addition of Disk C. The global metadata unit 210 is updated to show two additional local data units LocalData B and LocalData C. "LocalData B" corresponds to logical blocks 0x10000000-0x1FFFFFFF, and "LocalData C" corresponds to logical blocks 0x20000000-0x2FFFFFFF. The addition of Disk C has expanded the capacity of "Volume 1" to 0x30000000. The local metadata unit 212A is the same as described above. A local metadata unit 212B includes fields for a RAID type (e.g., RAID-1, 2 drives), and drive map information (e.g., Disk A storing logical blocks 0x10000000 to 0x1FFFFFFF and Disk C storing logical blocks 0x00000000 to 0x0FFFFFFF). A local metadata unit 212C includes fields for a RAID type (e.g., RAID-1, 2 drives), and drive map information (e.g., Disk B storing logical blocks 0x10000000 to 0x1FFFFFFF and Disk C storing logical blocks 0x10000000 to 0x1FFFFFFF).

Thus, by adding Disk C to the logical volume, two new local metadata units are created. Each of the new local metadata units includes a description of a new local RAID set. Each of the new local RAID sets includes the new Disk C and a disk from the previous RAID set (Disk A and Disk B). It is assumed that the local RAID set A is not full (i.e., Disks A and B have unused storage space). The unused storage space on Disk A is used with space on Disk C to create local RAID set B. The unused storage space on Disk B is used with space on Disk C to create local RAID set C. The capacity of the logical volume "Volume 1" increases geometrically in response to the addition of Disk C. The capacity of the logical volume will continue to increase geometrically with as additional disks are added until the original local RAID set (local RAID set A) is full. Further expansion can be obtained by adding another local RAID set to the logical volume.

Figure 5:
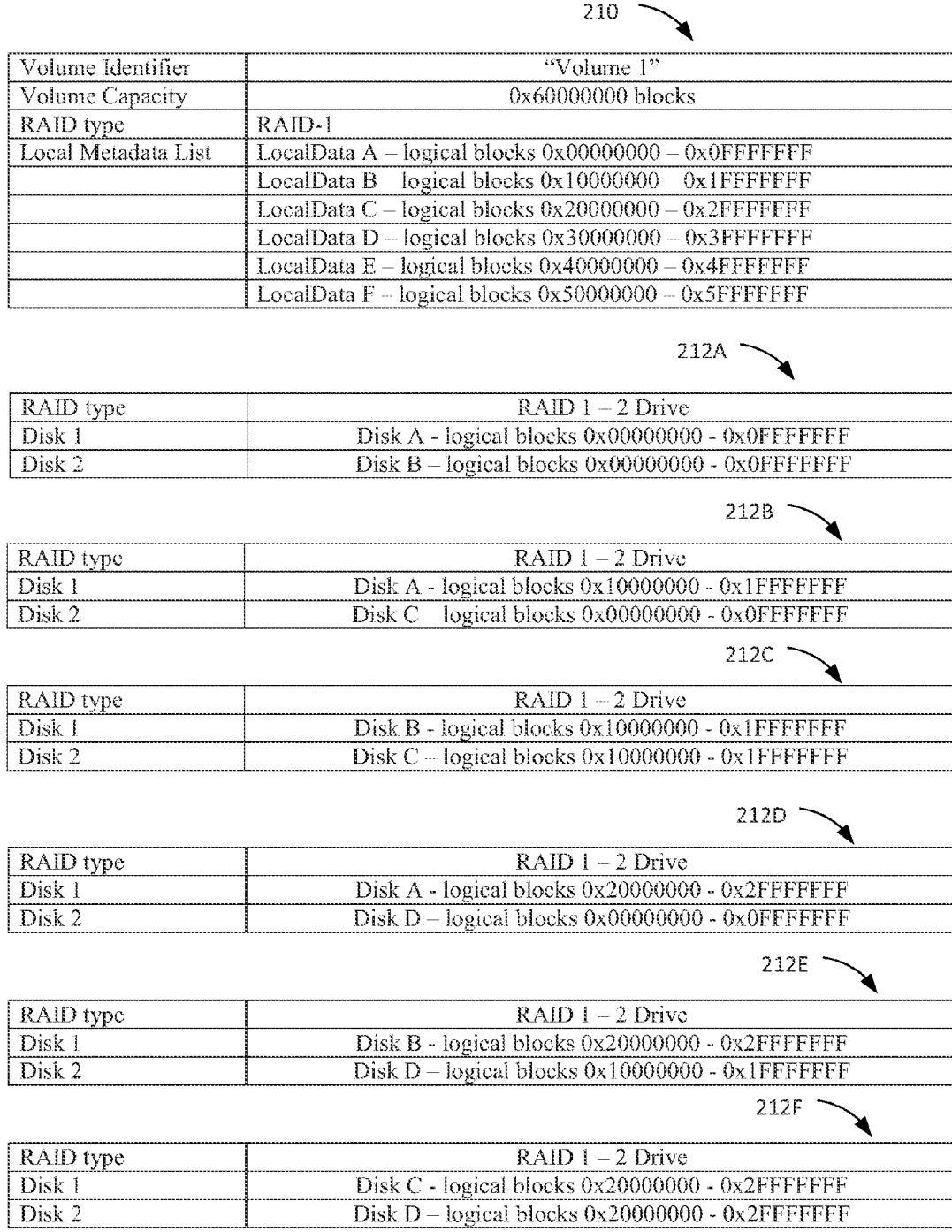
FIG. 5 is a block diagram showing global and local metadata units according to another example implementation.

FIG. 5 is a block diagram showing global and local metadata units according to an example implementation. In the present example, the "Volume 1" logical volume is expanded by the addition of Disk D (assuming unused space on Disks A and B). As described above in FIG. 4, Volume 1 includes three local RAID sets A-C. By the addition of Disk D, "Volume 1" will include six local RAID sets A-F. The global metadata unit 210 is updated to show two additional local data units LocalData D, LocalData E, and LocalData F. "LocalData D" corresponds to logical blocks 0x30000000-0x3FFFFFFF, "LocalData E" corresponds to logical blocks 0x40000000-0x4FFFFFFF, and "LocalData F" corresponds to logical blocks 0x50000000-0x5FFFFFFF. The addition of Disk D has expanded the capacity of "Volume 1" to 0x60000000.

The local metadata units 212A-212C are the same as described above. A local metadata unit 212D includes fields for a RAID type (e.g., RAID-1, 2 drives), and drive map information (e.g., Disk A storing logical blocks 0x20000000 to 0x2FFFFFFF and Disk D storing logical blocks 0x00000000 to 0x0FFFFFFF). A local metadata unit 212E includes fields for a RAID type (e.g., RAID-1, 2 drives), and drive map information (e.g., Disk B storing logical blocks 0x20000000-0x2FFFFFFF and Disk D storing logical blocks 0x10000000-0x1FFFFFFF). A local metadata unit 212F includes fields for a RAID type (e.g., RAID-1, 2 drives), and drive map information (e.g., Disk C storing logical blocks 0x20000000 to 0x2FFFFFFF and Disk D storing logical blocks 0x20000000 to 0x2FFFFFFF).

Figure 6:
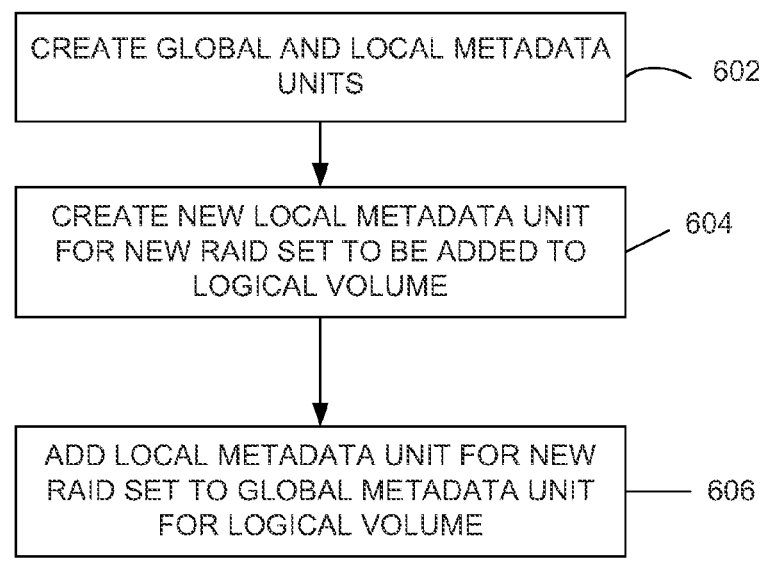
FIG. 6 is a flow diagram depicting a method of expanding capacity of a logical volume according to an example implementation.

FIG. 6 is a flow diagram depicting a method 600 of expanding capacity of a logical volume according to an example implementation. The method 600 can be performed by the controller 104 shown in FIG. 1, in particular, the OE 208 shown in FIG. 2. The method 600 begins at step 602, where a global metadata unit and a plurality of local metadata units are created for a logical volume. In an example, the controller 104 can create the global and local metadata units for a logical volume as described above. The global metadata unit can include a list of the plurality of local metadata units, and ranges of logical blocks of the logical volume corresponding to the plurality of local metadata units. Each of the local metadata units can include a description of a RAID set and a range of physical blocks on RAID set of the underlying physical drives.

In an example, the capacity of the logical volume can be expanded by adding a physical disk drive. At step 604, at least one new local metadata unit is created for a new RAID set having the new physical drive. Each new local metadata unit includes a description of the new RAID set to be added to the logical volume and a range of physical blocks on the new RAID set. Each new RAID set can include a RAID configuration of the new physical drive and at least one drive from an existing RAID set in the volume. For example, assume a logical volume includes an existing RAID-1 set of disk A and disk B that has available storage space. If a new physical disk C is added to the logical volume, a new RAID-1 set can be formed using disk C and disk A. The new RAID-1 set will have a size equal to the unused space on disk A. Another new RAID-1 set can be formed using disk C and disk B, where the size of the other new RAID-1 set is equal to the unused space on disk B.

At step 606, the new local metadata unit(s) for the new RAID set(s) is/are added to the global metadata unit for the logical volume to expand the logical volume to incorporate the new RAID set(s). Also, the global metadata unit can be updated in response to the addition of the new RAID set(s) (e.g., the capacity can be adjusted, etc.).

Thus, using the global and local metadata units described above, a logical volume can be expanded to include additional capacity by adding additional local metadata units to the local metadata list in the global metadata unit. For fault-tolerant volumes, drive redundancy can be maintained using the following scheme: When a disk is added, the amount of space used on the current drives in the existing RAID set is increased by the following formula:

$$S_N = S_{N-1} \times [(N-1)/(N-(Base+1))],$$

Where N is the number of disks and Base is the number of data drives of the RAID format of the RAID volume. For example, with an existing RAID set of three drives organized according to RAID-5, the Base value would be 2 and the value for $S_4$ would be equal to 3, meaning each drive would grow to three times the original space reserved. The OE 208 can perform the calculation described above and set the capacity of the logical volume accordingly in the global metadata unit. Given a quick rate of growth, when the drives are completely filled to a designated number equal to the size of the disks in the pool, an additional expansion can be performed by the addition of a new RAID set that can continue to grow according to the same formula above.

The instant capacity expansion technique described above eliminates the need to background operations to be performed on the logical volume. This allows the computing systems to immediately access the new capacity without any performance penalty incurred from using RAID controller resources to re-organize the data across the drives to maintain fault-tolerance (e.g., re-stripe or otherwise re-arrange the data in the constituent RAID sets). In addition, users can add capacity instantly for time-critical applications. Data re-organization can be scheduled at a later time.

In the foregoing description, numerous details are set forth to provide an understanding of the present invention, However, it will be understood by those skilled in the art that the present invention may be practiced without these details. While the invention has been disclosed with respect to a limited number of embodiments, those skilled in the art will appreciate numerous modifications and variations therefrom, It is intended that the appended claims cover such modifications and variations as fall within the true spirit and scope of the invention.

What is claimed is:

1. A method of expanding capacity of a logical volume, comprising:
   creating a global metadata unit and a plurality of local metadata units, where:
   the global metadata unit includes a description of the logical volume, a list of the plurality of local metadata units, and ranges of logical blocks of the logical volume corresponding to the plurality of local metadata units; and
   each of the plurality of local metadata units includes a description of a local RAID set and a range of logical blocks on the local RAID set;
   creating a new local metadata unit having a description of a new local RAID set to be added to the logical volume and a range of logical blocks on the new local RAID set;
   adding the new local metadata unit to the global metadata unit to expand the logical volume to incorporate the new local RAID set; and
   wherein the new local RAID set includes a new disk and at least a disk from a previous RAID set, and wherein the new local RAID set adds capacity to a previously established and utilized logical volume, and creating a second new local metadata unit having a description of a second new local RAID set, wherein the second new local RAID set is created, wherein the second new local RAID set includes the new disk and only a second disk from the previous RAID set.

2. The method of claim 1, wherein the plurality of local metadata units includes a first local metadata unit describing the previous RAID set having a plurality of physical disk drives.

3. The method of claim 1, wherein the description of the logical volume in the global metadata unit includes at least one of: a logical volume name, a logical volume capacity, or a RAID type.

4. The method of claim 1, wherein the description of the local RAID set in each of the plurality of local metadata units includes at least one of: a drive map of physical disk drives, a RAID type, or RAID parity information.

5. The method of claim 1, further comprising:
   storing data to the logical volume having the new local RAID set without rearranging data on any existing physical disk drives.

6. The method of claim 1, further comprising:
   updating the global metadata unit in response to the addition of the new local RAID set.

7. The method of claim 6, further comprising:
   adjusting the ranges of logical blocks of the logical volume corresponding to the plurality of local metadata units; and
   adding a new range of logical blocks of the logical volume to the new local metadata unit.

8. A controller of a logical volume, comprising:
   a memory to store a global metadata unit and a plurality of local metadata units, where:
   the global metadata unit includes a description of the logical volume, a list of the plurality of local metadata units, and ranges of logical blocks of the logical volume corresponding to the plurality of local metadata units; and
   each of the plurality of local metadata units includes a description of a local RAID set and a range of logical blocks on the local RAID set;
   a processor, coupled to the memory, to create a new local metadata unit having a description of a new local RAID set and a range of logical blocks on the new drive, and to add the new local metadata unit to the global metadata unit to expand the logical volume to incorporate the new local RAID set; and
   wherein the new local RAID set includes a new disk and at least a disk from a previous RAID set, and wherein the new local RAID set adds capacity to a previously established and utilized logical volume, and creating a second new local metadata unit having a description of a second new local RAID set, wherein the second new local RAID set is created, wherein the second new local RAID set includes the new disk and only a second disk from the previous RAID set.

9. The controller of claim 8, wherein the description of the logical volume in the global metadata unit includes at least one of: a logical volume name, a logical volume capacity, or a RAID type.

10. The controller of claim 8, wherein the local RAID set in each of the plurality of local metadata units includes at least one of: a drive map of physical disk drives, a RAID type, or RAID parity information.

11. The controller of claim 8, wherein the processor stores data to the logical volume having the new local RAID set without rearranging data on any existing physical disk drives.

12. The controller of claim 8, wherein the processor updates the global metadata unit in response to the addition of the new local RAID set to the logical volume.

13. The controller of claim 12, wherein the processor:
adjusts the ranges of logical blocks of the logical volume corresponding to the plurality of local metadata units; and
adds a new range of logical blocks of the logical volume to the new local metadata unit.

14. A storage system, comprising:
a plurality of physical drives forming a plurality of local RAID sets;
a controller to control the plurality of local RAID sets as a logical volume, the controller storing a global metadata unit and a local metadata unit, where:
the global metadata unit includes a description of the logical volume, a list of the plurality of local metadata units, and ranges of logical blocks of the logical volume corresponding to the plurality of local metadata units; and
each of the plurality of local metadata units includes a description of a respective one of the local RAID sets and a range of logical blocks on the respective one of the local RAID sets;
wherein the controller adds a new local RAID set to the RAID volume by creating a new local metadata unit having a description of the new local RAID set to be added to the RAID volume and a range of logical blocks on the new local RAID set, and adding the new local metadata unit to the global metadata unit to expand the logical volume to incorporate the new local RAID set; and
wherein the new local RAID set includes a new disk and at least a disk from a previous RAID set, and wherein the new local RAID set adds capacity to a previously established and utilized logical volume, and creating a second new local metadata unit having a description of a second new local RAID set, wherein the second new local RAID set is created, wherein the second new local RAID set includes the new disk and only a second disk from the previous RAID set.

15. The storage system of claim 14, wherein the description of the logical volume in the global metadata unit includes at least one of: a logical volume name, a logical volume capacity, or a RAID type.

16. The storage system of claim 14, wherein the description of the local RAID set in each of the plurality of local metadata units includes at least one of: a drive map physical drives, a RAID type, or RAID parity information.

17. The storage system of claim 14, wherein the controller stores data to the logical volume having the new local RAID set without rearranging data on any existing physical drives.

18. The storage system of claim 14, wherein the controller updates the global metadata unit in response to the addition of the new local RAID sets.

19. The storage system of claim 18, wherein the controller:
adjusts the ranges of logical blocks of the logical volume corresponding to the plurality of local metadata units; and
adds a new range of logical blocks of the logical volume to the new local metadata unit.

* * * * *